United States Patent [19]

Robillard

[11] 4,074,467
[45] Feb. 21, 1978

[54] GRINDING MACHINE CONTROL

[75] Inventor: Edward George Robillard, Cherry Valley, Mass.

[73] Assignee: Cincinnati Milacron-Heald Corporation, Worcester, Mass.

[21] Appl. No.: 777,024

[22] Filed: Mar. 14, 1977

[51] Int. Cl.² .............................................. B24B 49/00
[52] U.S. Cl. ................................ 51/165.92; 51/165.93
[58] Field of Search ............ 51/165 B, 165.77, 165.92, 51/165.93

[56] References Cited

U.S. PATENT DOCUMENTS

| 3,589,077 | 6/1971 | Lenning | 51/165.92 |
| 3,728,826 | 4/1973 | Wada | 51/165.77 |
| 3,796,012 | 3/1974 | Uhtenwoldt | 51/165.93 |

Primary Examiner—Harold D. Whitehead
Attorney, Agent, or Firm—James D. Liles

[57] ABSTRACT

A multimodal cycle for a grinding machine is modified as the function of the grinding force and the mode of operation. The grinding force is monitored by measuring the electrical load value upon the grinding wheel motor during operating conditions and biasing this value by a stored value representative of the nongrinding idle load. The idle load bias is updated with each grinding cycle and the grinding force signal is used to control a variety of machine operations. If the grinding force signal exceeds a predetermined threshold during an early portion of the grinding cycle, the wheelhead advancement is terminated; while the same situation in a later portion of the cycle permits continued wheelhead advancement but at a reduced rate. The grinding force signal is also used to count parts and detect part absence. It is further used to regulate rough and finished spark-outs as well as a peak load limit for the grinding cycle. The threshold level for these latter three functions is further modulated in accordance to the size of the grinding wheel.

24 Claims, 3 Drawing Figures

GRINDING MACHINE CONTROL

BACKGROUND

The present invention relates to grinding machines and more particularly to an apparatus for controlling grinding machine parameters as a function of grinding force exerted upon the grinding wheel.

It has become common practice in present day grinding machines to employ multimodal grinding cycles to reduce cycle time and enhance machine productivity. The typical cycle includes at least three distinct modes, each with different rates of grinding wheel advancement. The first mode in a typical grinding cycle sequence is the rapid advance mode, in which the grinding wheel is moved toward the workpiece from a machine loading position to a selected location therebetween. The purpose of the rapid advance mode, as the terminology suggests, is to rapidly move the wheel toward the workpiece in order to expedite the grinding cycle time. In an external grinder, this movement is generally in a direction transverse to the axis of the workpiece and powered hydraulically. In an internal grinder, the rapid advance generally comprises two movements; first, the table slide motion parallel to the workpiece axis which moves the grinding wheel into the workpiece cavity; and second, the cross slide movement which is transverse to the workpiece axis. The second, or gap eliminator mode commences with the termination of the rapid advance mode at the selected location. It is in this gap eliminator mode in which initial workpiece engagement is reasonably anticipated. The grinding wheel velocity in the second mode, frequently powered by an electrical stepping motor, is generally slower than the rapid advance rate but still in excess of that suitable for the grinding process. Since the wheel advance velocity during the second mode is excessive, provisions must be made for reducing the velocity after workpiece engagement in order to perform the actual grinding.

Prior art machines have performed this intermodal transition in several different ways. One method is to rapidly move the grinding wheel (or the workpiece if it is being moved to effectuate the relative movement with the grinding wheel) to a predetermined fixed position close to the inital engagement point. The third, or grinding mode is then initiated and the velocity is reduced to a lessor level which is suitable for grinding. A second more sophisticated method is that of force detection. In this method, a gap eliminator circuit monitors the grinding force by measuring electrical load upon the grinding wheel motor. A sudden increase in the current is then taken as an indication that workpiece engagement has occurred, and a signal is generated in response thereto and used to reduce the wheel velocity. It is in accordance to this latter method in which the apparatus of the present invention controls the grinding machine.

In the force detection method, it is desirable to reduce the wheel velocity as soon as possible after contact with the workpiece, which requires that the change in velocity occur with a small increase in motor current. In prior art machines, the grinding wheel current, which is approximately proportional to force, is biased by a fixed amount representing idle current in the motor. However, as a practical matter the idle current is not constant but varies with many factors including, inter alia, grinding wheel size, the drive train between the motor and the wheel, power surges, parts wear and temperature changes. Consequently, the idle current bias is set to the worst case situation which is too high for the best gap eliminator operation in most cases. Further, reducing the bias results in undesirable accidental triggering of the gap eliminator circuit.

It also sometimes happens that the grinding wheel makes contact with an object during a very early part of the grinding cycle, as for example, in the rapid advance mode. This generally represents a gross misoperation of the grinding machine and continued advancement of the wheel will frequently operate to the extreme detriment of the machine. Experience has shown that the best course of action in such circumstances is to retract the grinding wheel. Prior art grinders have attempted to solve this problem with an "interference circuit". The "interference circuit" monitors grinding force and is analogous to the gap eliminator circuit described above. It retracts the wheel whenever "interference" is encountered in the rapid advance mode. These attempts have been plagued by the same problems confronting the gap eliminator circuit and have generally worked independently of the gap eliminator.

The present invention presents a novel and unique solution to the aforementioned difficulties. A single cycle modification signal is utilized by both the interference and gap eliminator circuits, and the idle current bias is modulated on an updated basis with each new grinding cycle. Many of the time-dependent variables in the idle current compensation signal are eliminated, and the control's efficaciousness is improved markedly.

SUMMARY OF THE INVENTION

The invention relates to grinding machine of the type having a base, a wheelhead carrying a wheel motor for rotating an abrasive wheel, a headstock supported upon the base and means for effectuating relative movement between the wheelhead and headstock. A number of signals are generated to define a grinding cycle which includes (1) a rapid feed mode for positioning the wheelhead and headstock during which no grinding is anticipated; (2) a gap eliminator mode for positioning the wheelhead and headstock to initiate the grinding process; and (3) a grinding mode for performing the grinding operation. A signal representative of forces upon the abrasive wheel is monitored and compensated by an amount representative of nongrinding forces upon the wheel with each grinding cycle to produce a grinding force signal. Whenever the grinding force signal exceeds a predetermined magnitude during the rapid feed mode, an interference signal is generated and communicated to the effecting means to modify the grinding cycle and to retract the grinding wheel. If the grinding force exceeds this predetermined magnitude during the second or gap eliminator mode, this latter mode is terminated and a grinding mode commences. An additional output signal is produced whenever the grinding force exceeds a second predetermined magnitude, and the signal is used to control grinding machine parameters. The preferred embodiment utilizes a grinding force signal to count the number of parts which have undergone the grinding process and to detect the number of instances in which no workpiece is encountered in the grinding cycle. Rough and finish modes of the grinding cycle are regulated according to the grinding force signal, and each of the sparkout modes is terminated if the grinding force drops below a predetermined reference level prior to a set time sparkout period. A peak load circuit inhibits the grinding cycle if the load upon the grinding wheel exceeds a permissible maximum level. The reference levels for both sparkout modes and the peak load determination are modulated according to both grinding wheel size and grinding taper.

DESCRIPTION OF THE PREFERRED EMBODIMENT

Figure 1:
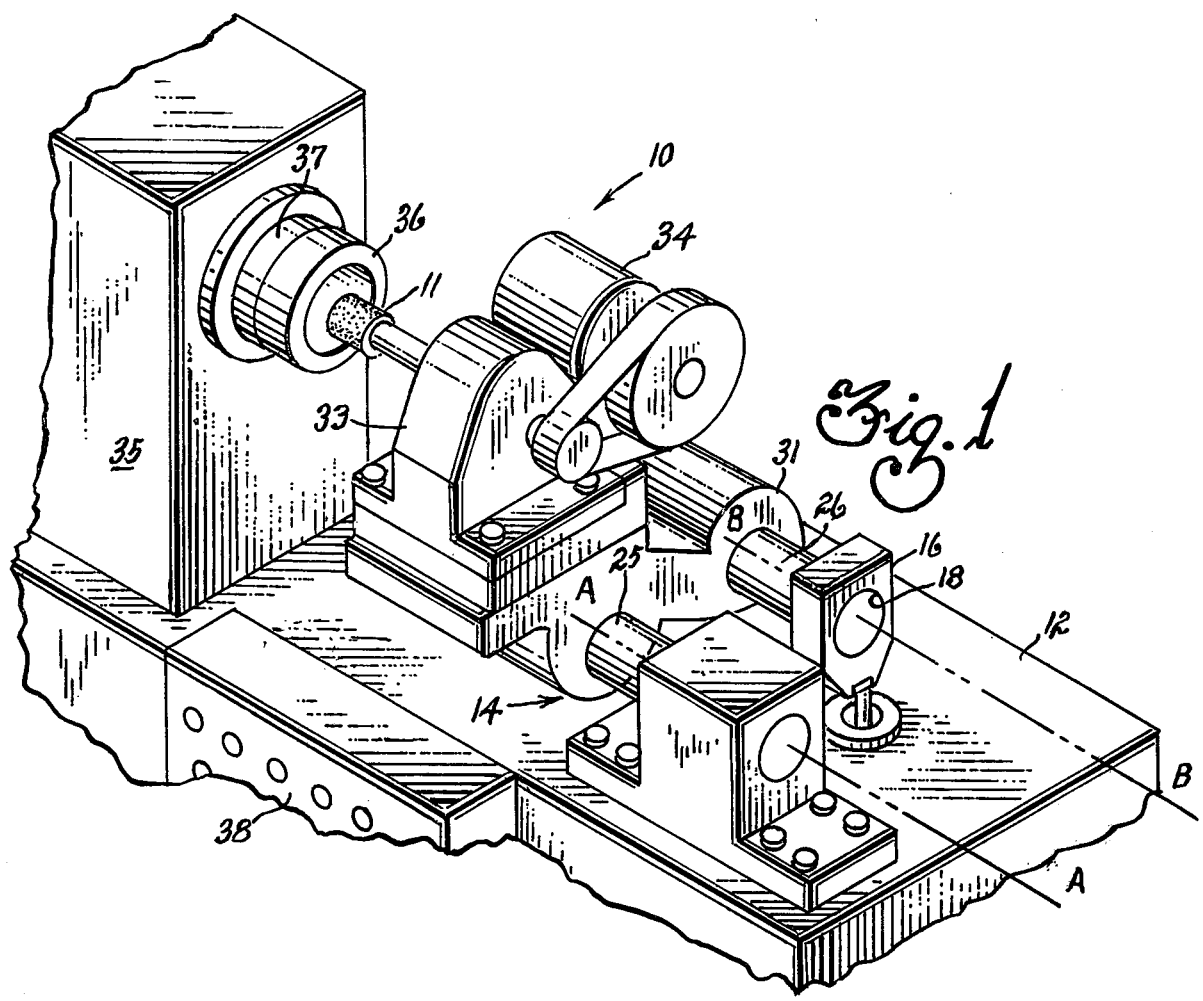
FIG. 1 is a schematic perspective view of one type of grinding machine which might utilize the present invention.
Figure 2:
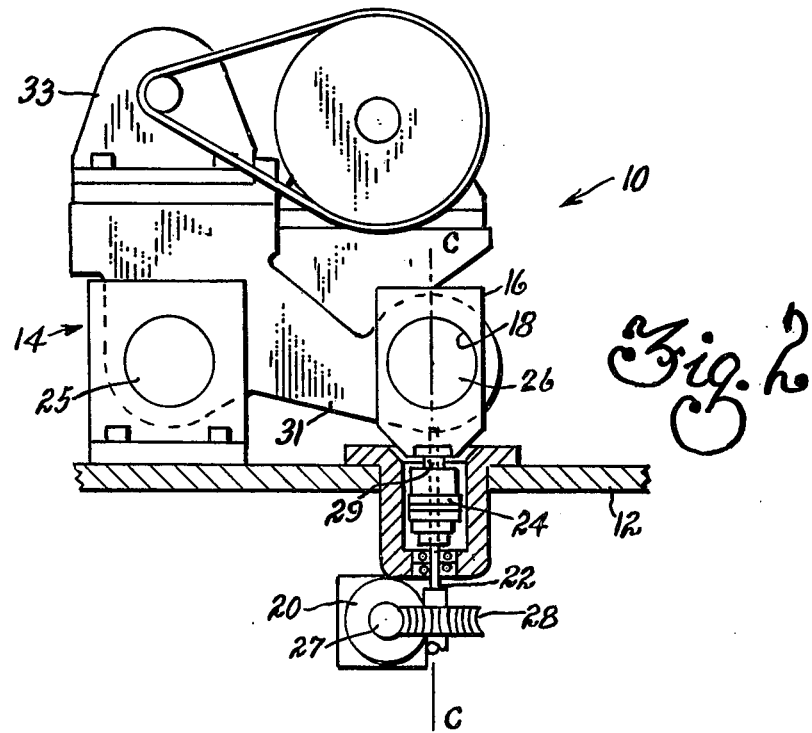
FIG. 2 is a diagrammatic end elevational view of the grinding machine of FIG. 1.

Referring jointly to FIGS. 1 and 2, a grinding machine which might utilize the present invention is shown in the preferred embodiment as an internal grinding machine 10 adapted to generate a surface of revolution by use of an abrasive wheel 11. The machine has a base 12 upon which a feed mechanism 14 is mounted. The feed mechanism includes a block 16 with a bearing 18 which is moved vertically by an electrical stepping motor 20 operated in response to electrical pulses. The motor 20 operates through a ball screw 22 and a nut 24, the axis of the ball screw 22 being indicated by line C—C in the drawings. This line C—C is perpendicular to a horizontal plane passing through axis A—A of a primary bar 25 and axis B—B of a secondary bar 26. The block 16 with its bearing 18 (which is of the hydrostatic type) is mounted upon the secondary bar 26. The stepping motor 20 has a worm 27 connected to a shaft, the worm 27, in turn, driving a worm gear 28. The ball screw 22 engages the nut 24 in a well-known manner and moves the block 16 up and down vertically carrying the secondary bar 26 with it. The block 16 is attached to the nut 24 by a flexible connection 29 which is relatively narrow in cross-section at a location between the nut and the bearing, permitting slight bending to compensate for any angular misalignment of the block 16 relative to the ball screw 22 and nut 24. This is necessary because of the fact that as the wheelhead table 31 swings about the axis A—A of the primary bar 25, it carrys the secondary bar 26 with it. The axis B—B of the secondary bar 26 moves in a broad arc, and this means that the bar 26 and block 16 also move slightly horizontally relative to the centerline or axis C—C of the ball screw 22. The wheelhead 33 is mounted upon the wheelhead table 31 and is driven by an electric motor 34; all of the mechanisms being mounted upon the base 12 in the usual way. The wheelhead table 31 may be slidably moved along primary bar 25, in the direction of axis A—A, by a linear actuatory (not shown) to insert the abrasive wheel 11 into the cavity of workpiece 36. The headstock 35 is also mounted on the base 12 for holding a workpiece 36 upon a magnetic chuck 37 for rotation about the axis of the surface of revolution which is to be finished. A main cycle control 38 serves to bring about relative movement between the workhead and headstock to produce a grinding cycle in the usual way.

Figure 3:
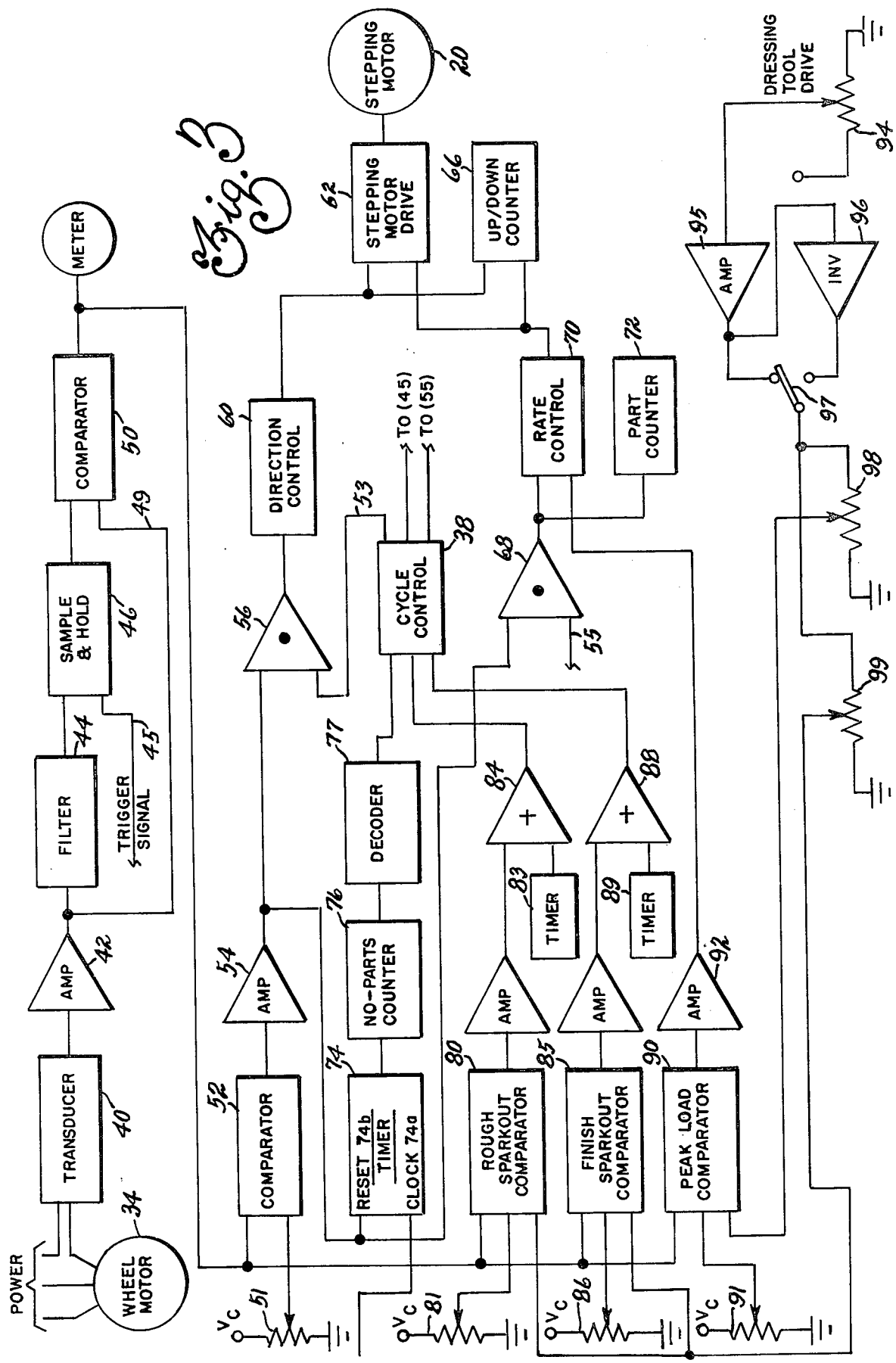
FIG. 3 is a schematic block diagram illustrating the control apparatus of the invention and demonstrating operation.

Referring now to FIG. 3, a load detecting means or transducer 40 is connected to the wheel motor 34. Transducer 40 will be described as a current transducer for purposes of illustration but as will be readily appreciated may be of any conventional type, as for example, a power or watt transducer. The transducer 40, which generates a signal proportional to the current drawn by the grinding wheel motor 34, is connected to an amplifier circuit 42, which is in turn connected to a filter circuit 44. The amplifier and filter circuits 42 and 44 amplify and buffer the transducer signal to provide a DC signal representative of the transducer signal which is applied to a sample and hold circuit 46. The sample and hold circuit 46, which may be of any of several commercially available units, samples the signal when the wheel is at rest in its fully retracted position prior to the commencement of the grinding wheel advancement. The sampling is done in response to a triggering signal on line 45 generated in response to the wheel being in its fully retracted position in any conventional manner (e.g. predetermined electrical pulse count, limit switch, etc.). The sampled transducer signal, which is stored for the duration of the grinding cycle, is representative of the idle current required to rotate the grinding wheel under no-load conditions, or in other words, the non-grinding forces upon the wheel motor 34.

Upon command of a first signal from the cycle control 38, an effecting means, shown as a stepping motor 20 in the preferred embodiment, produces rapid relative movement between the wheelhead 33 and the headstock 35 to commence the grinding cycle with a rapid advance mode. A comparator 50 receives a continuously monitored signal from transducer 40 after commencement of the grinding cycle through bypass circuit 49 and compares this value to that of the sample and hold circuit 46. Whenever the grinding wheel encounters a workpiece, the current drawn by the wheel motor 34 will rise suddenly, and the output of transducer 40 will increase accordingly. A disparity then develops between the monitored and stored signals, and the comparator 50 generates a grinding force signal in response thereto. The grinding force signal is proportional to the difference between the monitored and stored signals whenever the former exceeds the latter and thus represents the forces upon the grinding wheel attributable to grinding. This grinding force signal is then applied to a second comparator 52 where it is compared to a first reference signal of predetermined magnitude from a potentiometer 51. The magnitude of this first reference level is set at a level slightly in excess of anticipated fluctuations which might occur in the wheel motor current in order to insure that a grinding force signal exceeding the reference is in fact attributable to grinding forces upon the wheel.

A gating network comprising AND gate 56 is responsive to both the first signal on line 53, which initiated the rapid advance mode, and the grinding force signal from comparator 52 by way of a driver 54. The simultaneous occurrence of both of these signals produces an "interference" signal from AND gate 56 which is indicative of grinding wheel contact during the rapid advance mode; a situation which is suggestive of some type of gross misoperation of the machine. The "interference" signal is communicated to a direction control 60 which causes the stepping motor 20 to terminate the relative movement between the wheelhead 33 and headstock 35 and to effect the reversal of stepping motor drive 62, thereby retracting the grinding wheel to its rest or load position. It will also be appreciated that a hydraulically powered table slide may be retracted in an analogous way by applying the AND gate 56 output to a servo-amplifier, which controls a servo-valve to effectuate table slide retraction out of the workpiece cavity.

If the grinding wheel advances through the rapid advance mode without encountering any "interference", the cycle control 38 generates a second signal on line 55 initiating the second or gap eliminator mode. This second signal may be generated in response to a predetermined number of pulses to the stepping motor drive 62 measured by an up/down counter 66 or by contact of the wheelhead with a limit switch in the wheelhead advancement path, both of which are methods well known in the art. A second gating network comprising AND gate 68 is responsive to the second signal and the control signal from driver 54 to produce a gap elimination signal with the simultaneous occurrence of the two signals. The gap elimination signal is communicated to rate control circuit 70 which terminates the gap eliminator mode and reduces the wheel advancement velocity to initiate the grinding mode.

The up/down counter 66 measures pulses to the stepping motor drive 62 and thus provides an indication of the relative positions of the wheelhead 33 and the headstock 35. The control signal from driver 54 is also used to energize several other counters. Whenever the control signal is generated in the second mode of the cycle and a gap elimination signal is produced, a counting circuit, or digital part counter 72 is responsive to the second gating circuit and incrementally counts each occurrence of the gap elimination signal to produce a part signal representative of the number of parts which have undergone the grinding process. Additionally, a further counting circuit, no-parts counter 76, produces a signal representative of the number of times the grinding cycle was executed in the absence of a workpiece. This counting circuit 76 is responsive to a timing circuit 74. A clock input 74a to the timing circuit 74 receives the second cycle control signal, which initiates the second or gap eliminator mode of the cycle; and the circuit 74 will produce a signal unless the timer 74 is reset (74b) by the occurrence of the grinding force signal from driver 54 within the timing period. The period is set to be slightly longer than that reasonably anticipated for workpiece engagement by the wheel after the initiation of the gap eliminator mode. The absence of the gap eliminator signal, of course, indicates that no workpiece is in the headstock 35. The output signal from counting circuit 76 is received by a decoder 77 which in turn produces a cycle termination signal which is applied to cycle control 38 to terminate the cycle. The cycle termination signal may be generated upon a single occurrence of the no-part signal or after a predetermined number of such occurrences. Obviously, both the no-part counting circuit 76 and decoder 77 may be eliminated if it is desired to always terminate the grinding cycle with the occurrence of a single no-part signal.

The grinding force signal from comparator 50 is also used to regulate rough and finish spark-out periods of the grinding cycle. Such spark-out modes are generated by any well-known method. For example, in one type of control, (SIZEMATIC) the spark-out is initated by a predetermined number of pulses to the stepping motor drive 62 as measured by the up/down counter 66. A rough spark-out comparator 80 receives a reference signal from potentiometer 81 set for the desired rough spark-out force. The rough spark-out comparator then compares this reference signal with the grinding force signal from comparator 50 and generates an output signal whenever this latter force signal is equal to or less then the reference signal. The reference signal from this comparator is received by a driver 82 which then communicates the signal to an OR gate 84. An output of a timer 83 is also received by OR gate 84, the timer being activated by the initiation of the rough spark-out mode. The reception of the first of these first signals by OR gate 84 activates the gate and sends a signal to the cycle control 38, terminating the rough spark-out. Similarly, a finish spark-out comparator 85 receives a finish spark-out reference signal from potentiometer 86 which is compared to the grinding force signal. A driver 87 amplifies the finish spark-out termination signal whenever the driving force signal is equal to or less then the reference force signal and applies it to OR gate 88. Like the OR gate 84, OR gate 88 is responsive to the first of the two signals for its output, the second signal being from timer 89 which is initiated by the cycle control 38 with the commencement of the finish spark-out mode.

The grinding cycle control of the illustrated embodiment also includes a peak load control which inhibits the wheel advancement if the grinding force exceeds a predetermined peak load. A peak load comparator 90 further receives the grinding force signal. A reference signal emanating from potentiometer 91 is set at the peak permissible grinding load, and an inhibit signal is generated from the comparator whenever the grinding force signal is equal to, or exceeds, the peak load reference signal. The inhibit signal becomes amplified by driver 92 and applied to rate control 70 to reduce the rate of wheel advancement and consequently the grinding force upon the wheel.

The reference signals to the two spark-out comparators 80 and 85, as well as the peak load comparator 90, are modulated as a function of abrasive wheel size and the grinding taper. A potentiometer 94 on grinder dressing tool drive has an output varying in accordance with wheel size which is applied through an amplifier 95. This signal is then passed through a two-position switch 97 to parallel potentiometers 98 and 99 which in turn are connected to peak-load comparator 90 and spark-out comparators 80 and 85, respectively. The signals to each of these comparators modifies the respective reference signal inputs as a function of the wheel size. An inverter 96 is selectively inserted into the dressing wheel reference modulation circuit to reverse the polarity of the signal as a function of the grinding taper. Such an adjustment is especially desirable in an internal grinder due to the distortion of the quill supporting the grinding wheel experienced during the grinding operation.

Although the present invention has been described in conjunction with the preferred embodiment, it is to be understood that modifications and variations may be resorted to without departing from the spirit of the invention as those skilled in the art will readily understand. Such modifications and variations are considered to be within the view and scope of the present invention as defined by the appended claims.

I claim:

1. A grinding machine of the type having a base, a wheelhead carrying an abrasive wheel, a wheel motor for rotating the abrasive wheel, a headstock supported on the base and means for effecting relative movement between the wheelhead and its stock, said effecting means being responsive to a control generating a number of signals to define a grinding cycle having a number of modes including:

(1) a rapid advance mode for positioning the wheelhead and headstock preparatory to grinding and during which no grinding is anticipated, said rapid mode being initiated by a first signal from the control, (2) a gap eliminator mode for positioning the wheelhead and headstock to initiate the grinding process, said control generating a second signal to terminate the rapid advance mode and begin the gap eliminator mode, and (3) a grinding mode for performing the grinding operation, wherein the improvement comprises:

(a) means responsive to the wheel motor for providing a grinding force signal representing the forces of the grinding process, said providing means operating with each grinding cycle to continuously compensate the grinding force signal as a function of the changes in the nongrinding forces on the wheel motor;

(b) means responsive to the first signal and the grinding force signal and connected to the effecting means for producing an interference signal to modify the grinding cycle in response to the grinding force signal exceeding a predetermined magnitude;

(c) means responsive to the second signal and the grinding force signal and connected to the effecting means for producing a gap elimination signal in response to the grinding force signal exceeding the predetermined magnitude, said gap elimination signal operating to terminate the gap eliminator mode and begin the grinding mode; and (d) means responsive to the grinding force signal for producing an output signal in response to the grinding force signal exceeding a second predetermined magnitude; and (e) means responsive to the output signal for controlling the grinding cycle.

2. The apparatus of claim 1 wherein the means for providing a grinding force signal further comprises:

(a) means for producing a transducer signal representing the total forces on the wheel motor;

(b) means responsive to the transducer signal and the control for storing the transducer signal prior to the occurrence of said first signal, said stored transducer signal representing the non-grinding forces on the wheel motor; and (c) means having inputs responsive to the transducer signal and the stored transducer signal for producing the grinding force signal as a function of the difference between the inputs whereby said grinding force signal represents the grinding forces on the wheel motor.

3. The apparatus of claim 2 wherein the means for producing the transducer signal further comprises:

(a) a transducer connected to the wheel motor;

(b) an amplifier circuit connected to the transducer; and (c) a filter circuit connected to the amplifier circuit and producing a DC signal representing the transducer signal.

4. The apparatus of claim 3 wherein the means for storing the transducer signal further comprises a sample and hold circuit for sampling the transducer signal prior to the occurrence of the first signal and holding the sampled transducer signal for the duration of the grinding cycle.

5. The apparatus of claim 4 wherein the means for producing the grinding force signal further comprises a comparator circuit having a first input connected to the sample and hold circuit and the second input connected to the filter circuit, said comparator circuit operating to subtract stored transducer signal representing the non-grinding forces on the wheel motor from the transducer signal representing the total force on the wheel motor to produce the grinding force signal representing the grinding force on the wheel motor.

6. The apparatus of claim 1 wherein the means for producing the interference signal causes the effecting means to terminate operation thereby stopping relative movement between the wheelhead and the headstock.

7. The apparatus of claim 1 wherein the means for producing the interference signal causes the effecting means to reverse the relative movement between the wheelhead and the headstock and to reestablish their initial relative position prior to the occurrence of the first signal.

8. The apparatus of claim 7 wherein the means for producing the interference signal further comprises:

(a) a comparator circuit responsive to the grinding force signal for producing a control signal in response to the grinding force signal exceeding a first predetermined reference signal; and (b) a gating network responsive to the first signal and the control signal for producing the interference signal.

9. The apparatus of claim 8 wherein the means for producing the gap elimination signal further comprises a second gating network responsive to the second signal and the control signal for producing the gap elimination signal.

10. The apparatus of claim 9 wherein the improvement further comprises means responsive to the gap elimination signal for producing a part signal representing the number of workpieces subjected to the grinding process.

11. The apparatus of claim 10 wherein the means for producing the part signal further comprises a counting circuit responsive to the second gating network in incrementing one count in response to each occurrence of the gap elimination signal to produce the part signal.

12. The apparatus of claim 11 wherein the improvement further comprises:

(a) means responsive to the control signal for producing a no-part signal representing the number of times the grinding cycle was executed in the absence of a workpiece; and (b) means responsive to the no-part signal and connected to the control for modifying the grinding cycle in response to the no-part signal.

13. The apparatus of claim 12 wherein the means for producing the no-part signal further comprises a timing circuit having clock and reset inputs responsive to the second and gap elimination signals respectively and producing a no-parts signal in response to the presence of the second signal and the absence of the gap elimination signal.

14. The apparatus of claim 13 wherein the means responsive to the no-part signal further comprises a no-parts counting circuit and a decoder, said no-parts counting circuit incrementing one count in response to each occurrence of the no-parts signal and said decoder being responsive to a predetermined number of counts upon said no-parts counting circuit for producing a signal to modify the grinding cycle.

15. The apparatus of claim 1 wherein the means for producing the output signal further comprises:
   (a) means for producing a second reference signal as a function of the peak permissible grinding load; and
   (b) a comparator circuit responsive to the grinding force signal and the second reference signal and connected to the effecting means for inhibiting the operation of the effecting means in response to the grinding force signal being equal to or exceeding the second reference signal.

16. The apparatus of claim 15 wherein the means for producing the second reference signal further comprises means for modifying the second reference signal as a function of the size of the abrasive wheel.

17. The apparatus of claim 1 wherein the grinding cycle includes a rough spark out period and the means for generating the output signal further comprises:
   (a) means for producing a third reference signal representing the final rough spark-out force; and
   (b) a third comparator circuit responsive to the grinding force signal and the third reference signal and connected to the control for generating a third output signal in response to the grinding force signal being equal to or less than the third reference signal.

18. The apparatus of claim 17 wherein the means for producing the third reference signal further comprises means for modifying the third reference signal as a function of the size of the abrasive wheel.

19. The apparatus of claim 18 wherein the means for producing the third reference signal further comprises means for modifying the third reference signal as a function of the taper in the workpiece.

20. The apparatus of claim 17 wherein the means for producing the output signal further comprises:
   (a) a timing circuit responsive to the control for producing a timing signal defining the length of the rough spark-out period; and
   (b) an OR gate having inputs connected to the third output signal and the timing signal and having an output connected to the control whereby the rough spark-out period is terminated in response to the signal first occurring on the OR gate inputs.

21. The apparatus of claim 1 wheren the grinding cycle includes a finish spark-out period and the means for generating the output signal further comprises:
   (a) means for producing a fourth reference signal representing the final finish spark-out force; and
   (b) a third comparator circuit responsive to the grinding force signal and the fourth reference signal and connected to the control for generating a fourth output signal in response to the grinding force signal being equal to or less than the fourth reference signal.

22. The apparatus of claim 21 wherein the means for producing the fourth reference signal further comprises means for modifying the fourth reference signal as a function of the size of the abrasive wheel.

23. The apparatus of claim 21 wherein the means for producing the fourth reference signal further comprises means for modifying the fourth reference signal as a function of the taper in the workpiece.

24. The apparatus of claim 21 wherein the means for generating the output signal further comprises:
   (a) a timing circuit responsive to the control for producing a second timing signal defining the length of the rough spark-out period; and
   (b) a second OR gate having inputs connected to the fourth output signal and the second timing signal and having an output connected to the control whereby the finish spark-out period is terminated in response to the signal first occurring on the second OR gate inputs.

* * * * *